US010955539B2

(12) United States Patent
Brett et al.

(10) Patent No.: US 10,955,539 B2
(45) Date of Patent: Mar. 23, 2021

(54) LAYERED TACTICAL INFORMATION SYSTEM AND METHOD

(71) Applicant: Goodrich Corporation, Charlotte, NC (US)

(72) Inventors: Timothy Brett, Reading, MA (US); Zachary D. Wilson, Ayer, MA (US); Ravi Sankar Venkata Mallajosyula, Wilmington, MA (US); Kevin J. Whitcomb, Shrewsbury, MA (US)

(73) Assignee: Goodrich Corporation, Charlotte, NC (US)

( * ) Notice: Subject to any disclaimer, the term of this patent is extended or adjusted under 35 U.S.C. 154(b) by 196 days.

(21) Appl. No.: 16/159,107

(22) Filed: Oct. 12, 2018

(65) Prior Publication Data

US 2020/0116848 A1  Apr. 16, 2020

(51) Int. Cl.
*G01S 13/06* (2006.01)
*F41J 5/052* (2006.01)

(52) U.S. Cl.
CPC .............. *G01S 13/06* (2013.01); *F41J 5/052* (2013.01); *G06T 2207/30212* (2013.01)

(58) Field of Classification Search
CPC ............. G06F 16/9535; G06F 16/2455; G06F 16/248; G06F 16/245; G06F 16/9038;
(Continued)

(56) References Cited

U.S. PATENT DOCUMENTS 8,996,447 B2   3/2015  Ziegler
9,424,521 B2   8/2016  Bloomquist et al.
(Continued)

FOREIGN PATENT DOCUMENTS

WO   WO-2016187112   11/2016

OTHER PUBLICATIONS

Extended European Search Report for European Patent Application No. EP19202569.0, dated Feb. 7, 2020.

*Primary Examiner* — Hung T Vy
(74) *Attorney, Agent, or Firm* — Locke Lord LLP; Scott D. Wofsy; Judy R. Naamat (57) ABSTRACT

A layered tactical information system and a method of sharing tactical information between multiple layers are provided. The method performed by a processor of each layer of the multiple layers includes searching for relevant data available to the processor of the layer in response to at least one of a layer request from the processor of another layer of the multiple layers and a directive received by a processor of a first layer of the multiple layers. The directive specifies an end state, one or more target types, a time window, a geographic location area, and a first layer requirement of at least one layer requirement to be resolved by the processor of the first layer. The method performed by the processor further includes evaluating whether a layer requirement of the at least one layer requirement for the layer is satisfied based on at least one of (a) any found relevant data that was found by the search and (b) layer data obtained from at least one of the other layers. When the layer requirement for the layer is not satisfied, the method performed by the processor further includes performing at least one of (a) transmitting, by the processor of the layer to the processor of another layer of the multiple layers, a layer request to gather further information and (b) generating layer data and providing the layer data generated to the processor of at least one other layer.

14 Claims, 5 Drawing Sheets

(58) Field of Classification Search
CPC .. G06F 3/0482; G06F 16/144; G06F 16/3331; G06F 16/9032
USPC ........................................................ 707/770
See application file for complete search history.

(56) References Cited

U.S. PATENT DOCUMENTS

2015/0032486 A1* 1/2015 Francois ................ G06Q 10/02
705/5
2017/0308836 A1 10/2017 Kass \* cited by examiner

LAYERED TACTICAL INFORMATION SYSTEM AND METHOD

BACKGROUND OF THE INVENTION

1. Field of the Invention

The present disclosure relates to a tactical information system, and more particularly, to integration between multiple layers of a tactical information system (TIS) for supporting autonomous processing of a directive submitted to the TIS from an external source.

2. Description of Related Art

Tactical information can be obtained, processed, shared, and generated in multiple layers. With regards to military applications, tactical information is used to make tactical decisions, such as for organizing, deploying, and employing military forces on or near a battlefield, meaning on a small scale. The military forces can include kinetic or firepower, mobility, protection or security, and shock action. This can include reconnaissance for gathering more information at various stages of an operation. When performing an operation, each layer may depend on information from at least another layer in order to perform its tasks in association with the tactical information. However, a layer may not know which information it needs or from where to obtain the information.

While conventional methods and systems have generally been considered satisfactory for their intended purpose, there is still a need in the art for a layered tactical information system and method in which the layers can interact autonomously to obtain, process, share, and/or generate tactical information to perform the operation in coordination with the other layers.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a layered tactical information system (TIS). The TIS includes multiple layers, each includes a memory configured to store instructions and a processor disposed in communication with the memory. The processor of each layer of the multiple layers, upon execution of the instructions is configured to search for relevant data available to the processor of the layer in response to at least one of a layer request from the processor of another layer of the multiple layers and a directive received by a processor of a first layer of the multiple layers, the directive specifying an end state, one or more target types, a time window, a geographic location area, and a first layer requirement of at least one layer requirement to be resolved by the processor of the first layer; evaluate whether a layer requirement of the at least one layer requirement for the layer is satisfied based on at least one of (a) any found relevant data that was found by the search and (b) layer data obtained from at least one of the other layers; and when the layer requirement for the layer is not satisfied, perform at least one of (a) transmitting, by the processor of the layer to the processor of another layer of the multiple layers, a layer request to gather further information and (b) generating layer data and providing the layer data generated to the processor of at least one other layer.

In accordance with embodiments, the first layer is an intelligence layer, a second layer of the multiple layers is an information layer, and a third layer of the multiple layers is a data layer.

In embodiments, the processor of the intelligence layer is configured to search for first relevant data of the relevant data in at least one of stored intelligence layer data and received information layer data of the layer data, and evaluate the first layer requirement. When the first layer requirement is not satisfied, the processor of the intelligence layer is further configured to transmit a first request of the layer request for the information layer data to the processor of the information layer, receive the information layer data from the processor of the information layer, generate intelligence layer data of the layer data based on the information layer data received, and at least one of provide the intelligence layer data and/or the first relevant data to an external source and store the intelligence layer data.

In embodiments, the processor of the information layer is configured to search for second relevant data of the relevant data in at least one of stored information layer data and data layer data of the layer data provided by the processor of the data layer, provide the second relevant data to the processor of the intelligence layer, and evaluate a second layer requirement of the layer requirement. When the second layer requirement is not satisfied, the processor of the information layer is further configured to transmit a second request of the layer request for the data layer data to the processor of the data layer, receive the data layer data from the processor of the data layer, generate information layer data of the layer data based on at least one of the data layer data received and automatic target recognition (ATR) data received from an ATR source, and at least one of provide the information layer data and/or the second relevant data to the processor of the intelligence layer and store the information layer data.

In accordance with embodiments, the processor of the data layer is configured to search for third relevant data of the relevant data in stored data layer data, provide the third relevant data to the processor of the information layer, and evaluate a third layer requirement of the layer requirement. When the third layer requirement is not satisfied, the processor of the data layer is further configured to generate the data layer data based on sensor data received from a sensor source, and at least one of provide the data layer data and/or the third relevant data to the processor of the information layer and store the data layer data.

In embodiments, the processor of the information layer is further configured to apply a fusion process to at least of the second relevant data and the received data to output a single fused data element based on several data elements to which the fusion process is applied, and provide the fused data element to the processor of the intelligence layer and/or store the fused data element.

In embodiments, providing the layer data to the at least one other layer includes publishing the layer data.

In another aspect, a method of sharing tactical information between multiple layers is provided. The method performed by each layer of the multiple layers includes searching for relevant data available to the layer in response to at least one of a layer request from another layer of the multiple layers and a directive received by a first layer of the multiple layers. The directive specifies an end state, one or more target types, a time window, a geographic location area, and a first layer requirement of at least one layer requirement to be resolved by the first layer. The method further includes evaluating whether a layer requirement of the at least one layer requirement for the layer is satisfied based on at least one of (a) any found relevant data that was found by the search and (b) layer data obtained from at least one of the other layers. When the layer requirement for the layer is not satisfied, the method includes performing at least one of (a) transmitting, by the layer to another layer of the multiple layers, a layer request to gather further information and (b) generating layer data and providing the layer data generated to at least one other layer.

In accordance with still another aspect of the disclosure, a non-transitory computer readable storage medium having one or more computer programs stored therein associated with multiple layers of a tactical information system is provided. The computer programs associated with each layer comprising instructions, which when executed by a processor of a computer system, cause the processor to perform the operations of the method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
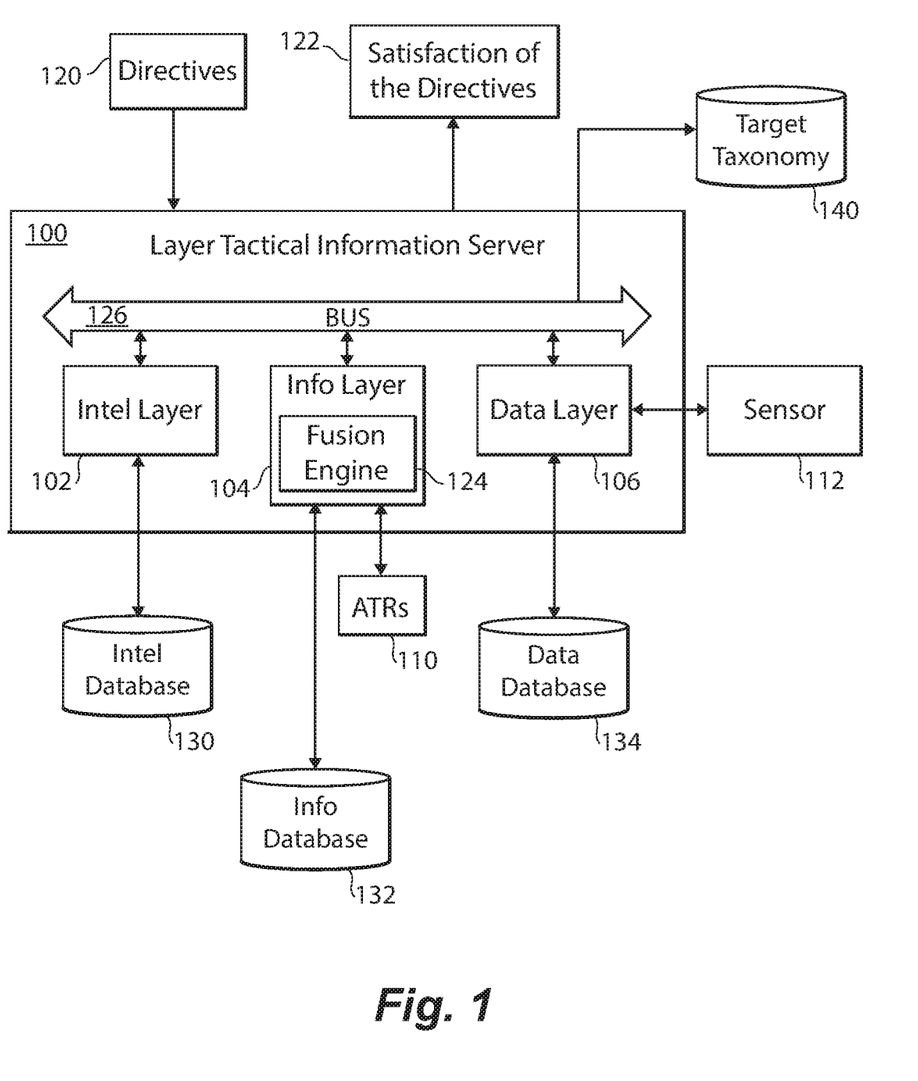
FIG. 1 is a schematic view of an exemplary embodiment of a tactical information system (TIS) in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a tactical information system in accordance with the disclosure is shown in FIG. 1 and is designated generally by reference character 100. Methods associated with operations of the tactical information system (TIS) 100 in accordance with the disclosure, or aspects thereof, are provided in FIGS. 2-5, as will be described. The systems and methods described herein can be used to provide improved autonomous sharing and gathering of information between layers of the tactical information system.

Tactical information can be obtained, processed, shared, and generated by the tactical information system 100. The TIS 100 can obtain, process, share, and generate tactical information in multiple layers. The tactical information can include sensed data obtained by sensors on one or more platforms, target recognition output, such as by an automatic target recognition (ATR) system, and intelligence data that coordinates information from multiple ATR systems. The multiple layers, shown in the current example, include an intelligence layer (also referred to as intel layer) 102 that processes intelligence data, an information layer (also referred to as info layer) 104 that processes target recognition output, and a data layer 106 that processes sensed data.

The intel layer 102, info layer 104, and data layer 106 exchange information with another, such as by requesting data, transmitting data and publishing data. In embodiments, a bus 126 is provided via which the data can be exchanged. In embodiments, the intel layer 102, info layer 104, and data layer 106 can exchange information via wired or wireless communication links and/or a network, such as a VPN, intranet, extranet, or the Internet. The TIS 100 can receive directives 120 from an external source, such as from a user via a user interface (e.g., a graphical user interface) or via another processing device.

Automatic target recognition (ATR) units 110 (also referred to as ATRs 110) can be provided that process sensor data to recognize and identify targets. The ATRs 110 can communicate with the info layer 104, for example, by wired or wireless communication links and/or a network, such as a VPN, intranet, extranet, or the Internet. Sensors 112 can be can be provided that sense physical properties and output corresponding sensor data. The sensors 112 can communicate with the data layer 106, for example, by wired or wireless communication links and/or a network, such as a VPN, intranet, extranet, or the Internet.

The directive can describe a tactical task that is being directed to be performed. In the present example, the intel layer 102 receives the directive as an intelligence request 120 (also referred to as an intel request), determines whether the intel layer requirement has been met, and outputs a satisfaction indication 122 that indicates satisfaction of the intelligence request 120. The satisfaction indication 122 can be intelligence that can be displayed, stored, published, and/or otherwise communicated to an external source, e.g., the GUI.

The intel layer 102 can access an intelligence database (also referred to as intel database) 130, the info layer 104 can access an information database (also referred to as info database) 132, and the data layer 106 can access a data database 134. The intel database 130, info database 132, and data database 134 can be internal or external to the TIS 100, and can be internal or external to the respective intel layer 102, info layer 104, and data layer 106. The intel database 130, info database 132, and data database 134 can be included in a single database system.

Communication with the intel database 130, info database 132, and data database 134 can be via one or more respective wired or wireless communications links. The intel database 130, info database 132, and data database 134 can be remote, such as accessible via a network, such as a VPN, intranet, extranet, or the Internet.

A target taxonomy 140 can be provided that can be accessed by the intel layer 102, the info layer 104, and the data layer 106. The target taxonomy 140 can provide a taxonomy of target types. The taxonomy can organize different target types into categories and one or more subcategories that can be nested. The target taxonomy 140 can be used to look up target type and determine more general or specific categories for that target type.

The intel layer 102, info layer 104, and data layer 106 include at least one processing device that enables the respective layer to search for data available to it that is relevant. The search for relevant data can be in response to a request from another one of the layers 102, 104, 106 (referred to as a layer request) or the intel request 120. Each layer 102, 104, 106 can have an associated requirement (referred to as a layer requirement). Processing a received intel request 120 by the intel layer 102 or a layer request by info layer 104 or data layer 106 can include evaluating whether the corresponding layer requirement of the at least one layer requirement for the layer is satisfied based on any found relevant data that was found by the search and/or data obtained from at least one of the other layers of the intel layer 102, the info layer 104, or the data layer 106.

When it is determined based on the evaluation that the corresponding layer requirement is not satisfied, the layer 102, 104, 106 that performed the evaluation can transmit a layer request to one of the other layers 102, 104, 106 to gather further data and/or generate layer data and provide the generated layer data to at least one other layer of the multiple layers.

The intel request 120 can include, for example, a unique identifier (ID), an end state for processing the intel request 120 by the TIS 100, one or more intel target types to be processed, a time window for the tactical task to be performed within, a geographic location area specifying an area of interest (AOI) to apply to the tactical task, and an intel layer requirement.

The ID identifies the intel request 120. The end state can be any state of an ordered cycle of states. An example cycle of states includes the following states that, wherein the states progress to the next state of the cycle based on the example order: find, fix, and track. In the example, when in the find state the presence of a potential target is detected; when in the fix state, a confirmation is made that the potential target is the target of interest and its geographic uncertainty is reduced; and when in the track state, the potential target is continuously monitored and followed as it moves. For example, if the end state is track, then the TIS 100 must progress through the find and fix states before arriving at the track state. Additional states can be used for different applications. For example, for military applications following the track state, one or more of the following ordered states can be included in the cycle of states: target, engage, and assess. The target state can refer to determining a threat level of the potential target and improving its geolocation to a required level for engagement. The engage state can refer to confirming that the potential target is hostile taking a particular action relative to the potential target. The assess state can refer to confirming that the action taken in the engage state was successful.

The intel target types describe one or more types of targets that the end state will be applied to. These targets are actual physical objects. Some examples of intel target types include trucks, tanks, specific model tanks, F-18s, etc. The intel target types can specify a certain number of objects to be found (e.g., one truck) or the number can be unspecified (e.g., tanks). The geographic area can be specified by naming an area (e.g., Saint Louis or Pennsylvania or France) or providing geolocation coordinates (e.g., latitude/longitude) that describe the geographic area. The layer requirement can be a confidence value that indicates a level of confidence achieved for that layer.

The intel request 120 requests that the end state specified be achieved with a specified confidence level for the targets specified within the geographic area and time window specified. The intel request 120 expires after the time window specified ends. In an example, the satisfaction indication 122 can indicate completion for achieving the specified state of the specified number of intel target types in the geographic area at the specified confidence level before expiration of the intel request 120. In another example, the satisfaction indication 122 can indicate an amount of the intel target types within the geographic area specified for which the specified state was achieved at the specified confidence level once the intel request expired 120.

Figure 2:
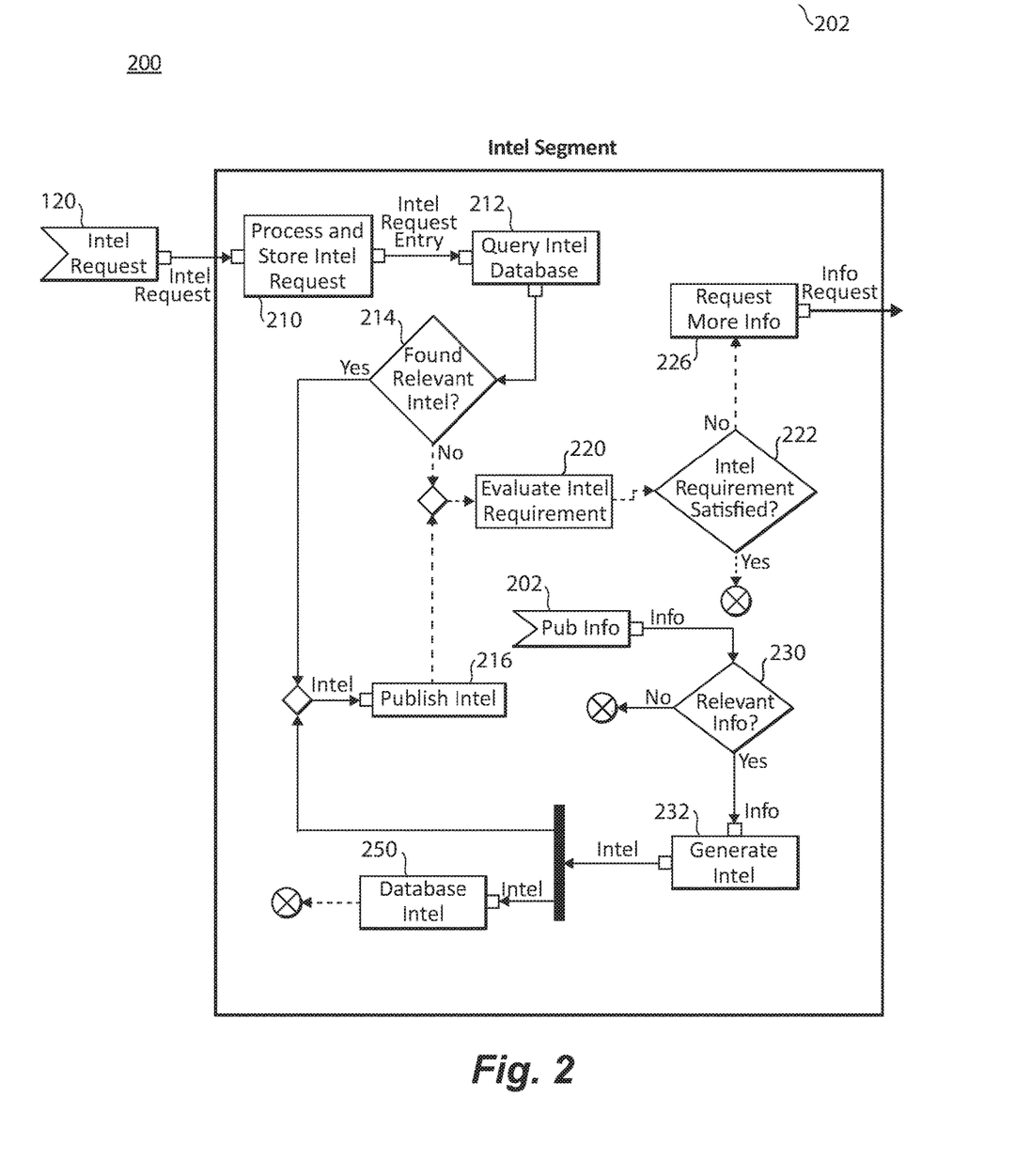
FIG. 2 is a flow diagram of an exemplary intelligence layer of the TIS of FIG. 1, in accordance with embodiments of the disclosure.
Figure 3:
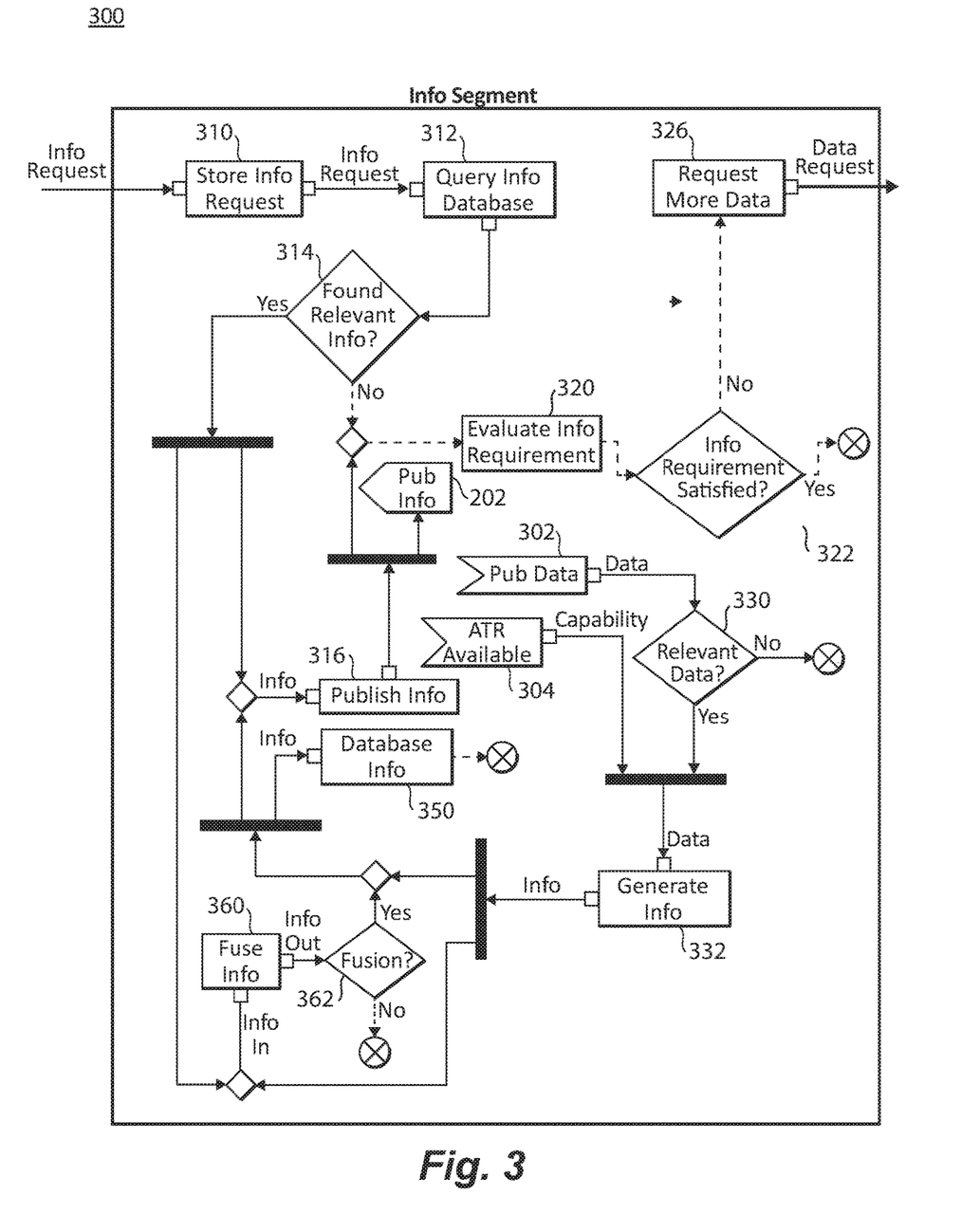
FIG. 3 is a flow diagram of an exemplary information layer of the TIS of FIG. 1, in accordance with embodiments of the disclosure.
Figure 4:
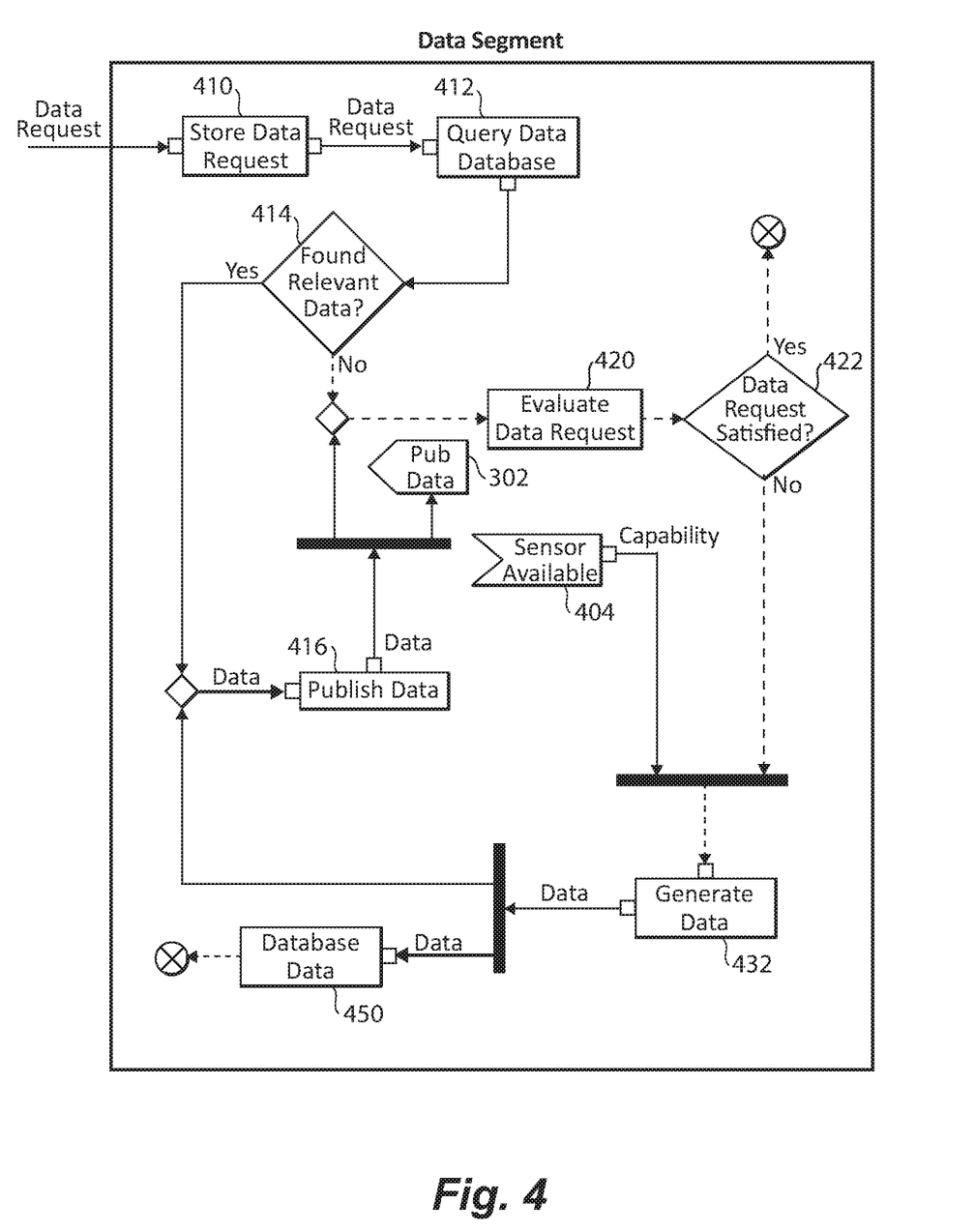
FIG. 4 is a flow diagram of an exemplary data layer of the TIS of FIG. 1, in accordance with embodiments of the disclosure.

With reference now to FIGS. 2-4, shown are flow diagrams demonstrating implementation of the various exemplary embodiments. It is noted that the order of operations shown in FIGS. 2-4 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 2 shows a flowchart 200 that illustrates an example method performed by an intelligence layer, such as intel layer 102 shown in FIG. 1. The intel layer 102 receives an intel request 120 from an external source and published info 202 that is published or otherwise provided by info layer 104. In the example shown, the intel request 120 includes a unique identifier (ID), an end state for processing the intel request 120 by the TIS 100, one or more intel target types to be processed, a time window for the tactical task to be performed within, a geographic location area specifying an area of interest (AOI) to apply to the tactical task, and an intelligence layer requirement.

At operation 210, the intel request 120 received by the intel layer 102 is processed and stored, such as in internal memory. The intel request 120 can be stored temporarily, such as in volatile storage, and/or can be persisted, such as in nonvolatile storage.

Processing the intel request 120 includes breaking it down into intel request entries. These intel request entries can be stored in local memory of the intel layer 102, however the intel request entries can be stored elsewhere without limitation. An intel request entry can be created for each unique combination of geographic area and intel target type and associated with the time window. For example, if an intel request 120 specifies three different geographic areas and four different intel target types, at operation 210 twelve intel request entries can be created and stored in memory.

At operation 212, the intel database 130 is queried to find intelligence layer data related to the intel request 120 or an intel request entry that is being processed. The intel database 130 stores intel entries that specify for the respective entries an intel geographic area, an intel time constraint, intel target types, current state, and target confidence (confidence in the intel target type and/or the intel geographic area). The intel database 130 is queried to find stored intel entries that have an intel geographic area and intel time constraint included within the time window of the intel request and that specify an intel geographic area and intel target type that matches geographic area and intel target type of one of the intel request entries. In embodiments, if it is determined that multiple matching intel entries are found, they can be merged into one intel entry by selecting data that represents the multiple intel entries. In embodiments, the multiple intel entries or the single intel entry can be linked to the intel request.

Other alternatives to merging intel entries include providing logic to eliminate duplicate intel entries prior to processing an intel request 120, or allowing for two duplicate intel entries in the intel database 130.

If no intel entries are found that are relevant by having an intel geographic area and intel time constraint included within the time window and geographic area of the intel request 120, then a state of current operation of the TIS 100 is determined and associated with the intel request 120.

At operation 214 a determination is made, such as via a database query, whether relevant intel entries were found in the intel database 130 at operation 212.

If the determination at operation 214 is YES, meaning that one or more relevant intel entries were found, then at operation 216 the relevant intel entries are made available as intel to one or more external sources that are waiting for access to the intel. In the example shown, making the intel available to the external source includes publishing the intel so that it can be received by any external source that is listening for published intel. The external source can be, for example, a user display or a process of a computer program that could use the intel. Other examples of making the intel available include transmitting the intel, writing the intel to a predetermined memory location, or otherwise providing the intel to the intelligence layers 102. Publishing the intel refers to broadcasting the intel so that it can be received by the external sources.

After publishing the intel at operation 216, the method continues at operation 220. At operation 220, the intel layer requirement of the intel request 120 is evaluated. Evaluating the intel layer requirement can include determining a confidence associated with the intel, such as internally or by an external source (e.g., the ATRs or the fusion engine 124. At operation 222 a determination is made whether the intel layer requirement is satisfied, which can include comparing the confidence determined for the intel to the confidence level of the intel layer requirement. At operation 222 a determination can further be made whether the current state is the end state specified by the intel request 120. The current state can be based on the relevant intel found at operation 214 or published info processed at operation 220. At operation 222, a determination can be made whether a time (e.g., timestamp) associated with the intel and/or the current time are within the time window specified by the intel requirement. This determination may be made only when the current state is equal to one more certain states, such as the track state.

If the determination at operation 222 is YES (for confidence and current state), then if the intel layer requirement provided by the intel request 120 has been satisfied, the branch of processing that reached operation 222 ends and processing of the intel request ends. For example, additional information is not requested from the info layer 104 and/or any published information 202 is not processed.

If the determination of operation 222 is NO for any targets associated with the intel request 120, meaning the intel layer requirement of the intel request 120 is not satisfied and/or the end state has not been reached yet by the current state, then at operation 226 a request for additional information (also referred to as an info request) is generated and provided to the info layer 104. Additionally, processing of any incoming published information 202 continues. The info request can be transmitted, written to a predetermined location in memory that can be accessed by the info layer 104, published, or otherwise provided to the info layer 104.

The info request can include a unique ID to identify the info request; an info geographic area the info request is interested in, which may be a subset of the geographic area in the intel request; an info target type the info request is interested in, which may be a subset of the intel target type; info request state, which is the state for which processing of the info request should be performed; modality, which is a sensor modality that is specified for obtaining the information sought by the info request; and a time window.

The info target type can be derived from the intel request and can be refined using the target taxonomy 140 and/or intel entries in the intel database 130.

The sensor modality can be determined based on which sensors are currently present, which can change dynamically. Information about which sensors are available can be announced by the sensors themselves and can be received by the data layer 106 at operation as published sensor capability information 404. The sensor modality can further be determined based on which ATRs 110 are available and their capabilities, as provided to the info layer 104 as ATR capability information 304. For example, if there are not any ATRs available that have the capability to process SAR data, then a sensor modality of SAR will not be included in the info request. The intel layer 102 can be aware of the sensor capability information 404 and/or the ATR capability information 304 by information published by the info layer 104 (e.g., by published info 202) and/or the data layer 106 (e.g., by published data 302).

Examples of sensor modalities include passive optical, active optical, synthetic aperture radar, ground moving target indicator, full motion video, hyperspectral imager, and laser imaging detection and radar. One or more of the fields of the info request can be optional, such as info target type, state, and modality.

If the determination at operation 214 is NO, meaning that no relevant intel entries were found, then the method continues at operation 220.

At operation 230, a determination is made whether the published information (also referred to as pub info) obtained at operation 202 includes relevant information (also referred to as "info") by determining whether the pub info timing information is included within the time window of the intel request and whether the pub info specifies a geographic area and target type that matches geographic area and intel target type of one of the intel request entries. If the determination at operation 230 is YES, meaning that relevant information was determined to be included in the pub info, the method continues at operation 232. At operation 232, intel is generated based on the relevant information that was determined to be included in the pub info. The intel is additional intelligence information that is not yet stored in the intel database 130 and includes information provided by the relevant info 230. The method continues at operations 250 and 216.

At operation 250, the intel is added as one or more intel entries to the intel database 130, after which the branch of processing that reached operation 250 ends. The intel stored to the intel database 130 will be available for processing of future intel requests 120 and/or for further processing of the intel request 120, such as if operation 212 is repeated before the intel requirement is determined to be satisfied at operation 222. At operation 216 the intel is published and evaluated with respect to the intel layer requirement at operation 220. The published intel can be a message that includes, for example, a unique identifier and the information included in the intel request. Additionally, the published intel can include target location and target location uncertainty determined for the requested target type, an indication as to whether the intel request has been satisfied or not (which remains "unsatisfied" until it is determined to be satisfied at operation 222), and unique IDs of intel entries added to the database at operation 250 or determined to be relevant at operation 214.

If the determination at operation 230 is NO, meaning that the no relevant information was determined to be included in the pub info, then the branch of processing that reached operation 230 ends.

When the intelligence layer 102 receives a new intelligence request 120, the end state field in the intelligence request 120 specifies which state in a cycle of states the intelligence request 120 seeks to achieve. The TIS 100 can change its behavior depending on the current state of an intel entry that was found to be relevant at operation 214 or was added to the database at operation 250. Thus, the intel layer 102 can update the state of such intel entries (for example at operation 220) to ensure that the instructions given in the intel request 120 are followed, provided that the time window specified by the intel request has not expired.

The intel layer 102 can use the end time specified in the time window of the intel request 120 to determine when the intel request 120 has expired and is deemed inactive. However, this does not mean that intel request entries cannot be satisfied independent of the intel request 120. It does mean that when it is determined at operation 222 that an intel request entry is satisfied, at operation 226 it can be determined based on time till expiration of the intel request 120 whether a next intel request entry associated with the intel request 120 should be processed.

At operation 226, if the intel layer requirement has not been met, then one or more info requests can be generated to satisfy the intel layer requirement for the current state. If the intel layer requirement has been met, then at operation 226 a new intel request entry is generated that has an updated interim end state which is set to the next state based on the cycle of states, which in the current example is "fix."

In an example, assume that the TIS 100 received an intel request 120 (i.e., directive) whose end state field is "track," and it is determined that the first state of the cycle of states needed to accomplish a "track" state is "find." The intelligence layer 102 at operation 210 can create an intel request entry to be associated with the intel request 120 that has an interim end state of "find." At operation 214, TIS system 100 can identify a target included in an intel entry that is relevant to this intel request entry and/or at operation 232, TIS 100 can process relevant information in the published information and generate intel from it. At operation 220 the intel request entry with interim end state "find" is evaluated in view of the relevant intel found at operation 214 or the intel generated at operation 232. At operation 222 a decision is made whether the intel layer requirement and/or interim end state have been satisfied until both the intel layer requirement and/or the interim end state have been satisfied, or the time window has expired.

If the intel request 120 was for one target, the intel layer requirement can be determined to be satisfied at operation 222. However, if the intel request 120 did not specify a number of targets to track, the intel request 120 is not looking for just one target, it is looking for all targets until the time window expired (based on End Time). The intel layer 102 can then create a new intel request entry having state 'find' in order to find other targets until the intel request's 120 time window expires.

FIG. 3 shows a flowchart 300 that illustrates an example method performed by an information layer, such as info layer 104 shown in FIG. 1. The info layer 104 receives an info request from the intel layer 102, published data 302 that is published or otherwise provided by data layer 106, and published ATR capability information 304, which is information about available ATRs that can communicate with the TIS 100, such as ATRs 110. The ATR capability information 304 describes what target types (e.g., tanks, planes, cars, motorcycles) an available ATR can find. This allows the TIS 100 to be agnostic without a need to know which particular ATR provides ATR capability information 304 and allows the TIS 100 to be adaptable based on the target set of a mission.

At operation 310, the info request received by the info layer 104 is processed and stored, such as in internal memory. Processing the info request can include breaking it down into multiple info sub-requests for respective sub-targets based on the target taxonomy 140 and/or target properties based on ATR capabilities indicated by the ATR capability information 304. Each info sub-request for a target property of a target or a sub-target can be for one of the ATRs based on its capabilities as indicated by the ATR capability information 304.

The info request can be stored temporarily, such as in volatile storage, and/or can be persisted, such as in nonvolatile storage. At operation 312, the info database 132 is queried to find information layer data related to the info request.

The info database 132 stores info entries associated with respective detections. An info entry can specify a target name of a detected target, a timestamp indicating a time of detection, a confidence of the detection, a geographic location of the target, a geographic location uncertainty that indicates an uncertainty of the geographic location, and a velocity of the target if it is a moving target. Also associated with the info entry can be a current state and/or a modality of sensor associated with detection of the target. The query, based on the info request, can seek targets of a type included in the info target type detected within a selected time window having a minimum confidence of detection, located within the info geographic area, and having a maximum uncertainty of the target geographic location. Inclusion within the specified target type can be determined using the target taxonomy 140. The info layer 106 works with existing ATRs 110 and/or the fusion engine 124 to boost confidence values associated with the entries in the info database 132 and decrease the geographic uncertainty associated with these entries.

At operation 314 a determination is made whether relevant info entries were found in the info database 132 at operation 312. If the determination at operation 314 is YES, meaning that one or more relevant info entries were found, the method continues at operations 316 and 360. At operation 316 the relevant info entries are made available as info to one or more intelligence layers 102 that are waiting for access to the info. The relevant info entries may include increased confidence and/or decrease the geographic uncertainty based on results of operation 360. In the example shown, making the info available to the intelligence layer 102 includes publishing the info. Other examples of making the info available include transmitting, writing the info to a predetermined memory location, or otherwise providing the info to the external sources. Publishing the info refers to broadcasting the info so that it can be received by the one or more intelligence layers 102.

After publishing the info at operation 316, the method continues at operation 320. At operation 320, the info requirement (also referred to as info req) of the info request is evaluated. Evaluating the info req can include determining a confidence associated with the info based on information about or provided by the ATRs and/or the fusion engine 124. At operation 322 a determination is made whether the info req is satisfied by comparing the confidence determined for the info to the confidence level of the info layer requirement. If the determination at operation 322 is YES, then the branch of processing that reached operation 322 ends.

If the determination of operation 322 is NO, then at operation 326 a request for additional data (also referred to as a data request) is generated and provided to the data layer 106. The data request can be transmitted, written to a predetermined location in memory that can be accessed by the data layer 106, published, or otherwise provided to the data layer 106.

There are two types of data requests: a targeted data request and an area data request. The determination whether to use a targeted data request or an area data request can depend, for example, on the info request, the current confidence of any relevant info entries, and the geo-uncertainty of any relevant info entries.

An area data request is not based on specific info generated by the info layer 104. Rather, the area data request is a generic request to collect data of a specified area, which can be a relatively large area. An area data collection can be used when there is a dearth of previous information associated with the corresponding info request. A dearth of previous information would be indicated, for example, if the determination at operation 314 was "NO," and the current state is the first state of the cycle of states (e.g., the "find" state in the current example). At this stage, the TIS 100 does not have much information to know where to look for data, so the area data request seeks data across a relatively large area, which would be the area specified by the corresponding info request.

On the other hand, a targeted data request can be used when there is associated intel (e.g., received at operation 214 or generated at operation 232) or received info (e.g., received at operation 202), which enables the TIS 100 to determine, e.g., at operations 232 and/or 226, that the info request can seek info for a relatively small area, without the need to cover a large area specified by the AOI of the intel request 120.

In an example intel request that looks for "red trucks in Massachusetts," an associated data request may cover an area the size of the state of Massachusetts. Since most sensors cannot collect data for such a large area in a single-pass, the data layer 106 can publish multiple responses for that area data request. It is possible, based on the flight path of the aircraft collecting the data, that the area data request will not be fully satisfied.

A targeted data request requests data about a specific info entry in the info database 132 to increase its confidence or decrease its geographic uncertainty. For example, a specific data request could request collection of data from the Westford Technology Park using a multispectral instrument (MSI) sensor. The info layer 104 can send repeated targeted data requests in order to satisfy a given info request. For example, a targeted data request can be sent to gather data from the same location from which existing data stored in an entry of the data database 134 was gathered. For example, if data was already found that was used to determine that a red truck was found in the Westford Technology Park, but its current target observation confidence does not meet the criteria specified in the intel layer requirement, further data can be requested to increase the confidence using the specific data request to collect data from the Westford Technology Park using an MSI.

Each data request can include a unique ID to identify the data request; a geographic area the data request is interested in, which may be a subset of the geographic area in the intel request and may further be a subset of the second geographic area of the associated info request; a data request state, which is the state for which processing of the data request should be performed; a time window, and modality, which is a sensor modality that restricts which sensor data can be used for responding to the data request. A priority can be associated with the data requests, and the targeted data requests can have a higher priority than area data requests. The data request state can be a next state in the progression of states to the end state for which data is still needed, and can be specified by the info request state of the associated info request. One or more of the fields of the data request can be optional, such as state, and modality.

If the determination at operation 314 is NO, meaning that no relevant info entries were found, then the method continues at operation 320.

At operation 330, a determination is made whether the published data (also referred to as pub data) obtained at operation 302 includes relevant data (also referred to as "data") by determining whether the pub data timing information is included within the time window of the info request and whether the pub data specifies a geographic area and data target type that matches geographic area and info target type of one of the info request.

If the determination at operation 330 is YES, meaning that relevant data was determined to be included in the pub data, the method continues at operation 332. At operation 332, info is generated based on the relevant data that was determined to be included in the pub data and/or based on the ATR capability information 304. Before generating the info, a determination can also be made using the ATR capability information 304 to identify which ATRs have the appropriate capabilities to process the published data 302, and a request can be submitted for the identified ATRs to process the published data that was determined to be relevant at operation 330. After the ATRs perform the requested processing, results from the ATRs can be received at operation 332. At operation 332 processing is performed to the results from the processing performed by the ATRs and/or the published data that determined to be relevant at operation 330. Results of the processing performed at operation 332 are output as info. The info can be processed at operations 316, 350, and/or 360.

At operation 316, the info is published and evaluated with respect to the info req at operation 320. At operation 350, the info is added to the info database 132, after which the branch of processing that reached operation 350 ends. The info stored to the info database 132 will be available for processing of future info requests and/or for further processing of the intel request 120, such as if operation 312 is repeated before the intel requirement is determined to be satisfied at operation 222 of the intelligence layer 102.

At operation 360, the info determined at operation 314 and the info generated at operation 332 are received as "info_in," a fusion operation is performed, and the "info_out" is output. The fusion operation seeks multiple entries of the info_in that can be fused together, and fuses them into one entry that can be stored or published as a single fused entry. U.S. patent application Ser. Nos. 15,863,458; 15,863,643; and 15,863,676 describe the fusion operation and are incorporated by reference herein in their entirety. The fusion operation can be configured to prohibit fusion of an entry of info_in that has been previously fused, e.g., as indicated by a tag. Info_out includes the fused entries. These fused entries are tagged as fused entries and identify entries of the info_in that were fused. Additionally, at operation 360 confidence values associated with fused entries can be boosted and geographic uncertainty associated with fused entries can be decreased. At operation 362 a determination is made whether the output info_out of operation 360 includes any fused entries.

If the determination at operation 362 is YES, meaning the info_out includes fused entries, then the method continues at operations 316 and 350 for publishing the fused entries and updating the info database 132 with the fused entries. Regarding operation 316, the fused entries are made available, e.g., published, to the intel layer 102. Regarding operation 350, the fused entries are stored in the info database 132 and the identified entries of info_in that were fused into the fused entries are also tagged as having already been fused. Info entries that are tagged as having already been fused may be ignored by queries processed at operation 312.

If the determination at operation 330 is NO, meaning that the no relevant data was determined to be included in the pub data, then the branch of processing that reached operation 330 ends.

FIG. 4 shows a flowchart 400 that illustrates an example method performed by a data layer, such as data layer 106 shown in FIG. 1. The data layer 106 receives a data request from the info layer 104 and published sensor capability information 404, which is information about available sensors that can communicate with the TIS 100, such as sensors 112. The sensor capability information 404 describes the type of sensor(s) that are available and the types of collections the sensor(s) can perform. For example a radio detection and ranging (RADAR) sensor has capabilities to operate in various operating modes, in one mode the RADAR sensor can generate synthetic aperture radar (SAR) images that would be useful when operating in the "find" state, and in another mode the RADAR sensor can operate as a ground moving target indicator (GMTI) that would be useful when operating in the "track" state. In another example, an optical sensor has capabilities to collect different spectrums of light, such as electro-optical or infrared.

This allows the TIS 100 to be agnostic without a need to know which particular sensor provides sensor capability information 404 and allows the TIS 100 to be adaptable based on the target set of a mission.

At operation 410, the data request received by the data layer 106 is processed and stored, such as in internal memory. Processing the data request can include breaking it down into multiple data sub-requests for respective target properties based on sensor capabilities indicated by the sensor capability information 404. Each data sub-request for a target property of a target or a sub-target can be for one of the sensors based on its capabilities as indicated by the sensor capability information 404.

The data request can be stored temporarily, such as in volatile storage, and/or can be persisted, such as in nonvolatile storage. At operation 412, the data database 134 is queried to find data layer data related to the data request.

The data database 134 stores data entries that specify a geographic area covered by and timestamp of a data collection by a sensor, and information (or an address where the information is stored) about the collection data, such as the type of collection it was (passive optical, RADAR, active optical, GMTI, etc.), the file format, a location of the output file (which may include images that are stored in an external database).

This information about the collection data can be metadata that is formatted in the file format that the data layer 106 can recognize. The data database 134 is queried to find stored data entries that meet the criteria specified by the data request (area data request or targeted data request). When the data request is an area data request, the data database 134 is queried to find collection data associated with a location and time stamp that are within the queried geographic area and time window specified by the area data request. When the data request is a targeted data request, the data database 134 is queried to find collection data that matches the specific criteria (e.g., small geographic area) and is within a time window specified by the targeted data request.

At operation 414 a determination is made whether relevant data entries were found in the data database 134 at operation 412.

If the determination at operation 414 is YES, meaning one or more relevant data entries were found, then at operation 416 the data is made available to one or more info layers 104 that are waiting for access to the info. In the example shown, making the data available to the info layer 104 includes publishing the data. Other examples of making the data available include transmitting, writing the data to a predetermined memory location, or otherwise providing the data to the info layer 104. Publishing the data refers to broadcasting the data so that it can be received by the one or more information layers 104

After publishing the data at operation 416, the method continues at operation 420. At operation 420, the data request is evaluated relative to relevant data entries determined at operation 414 or data collections obtained at operation 432. This can include comparing the overall geographic area that was requested by the data request (targeted data request or area request) to the geographic area that was covered by the data relevant data entries determined at operation 414 or data collections obtained at operation 432. The evaluation at operation 420 can further include determining whether image quality obtained by the data collections was satisfactory. At operation 422 a determination is made whether the data request is satisfied based on the evaluation at operation 420.

If the determination at operation 422 is YES, then the branch of processing that reached operation 422 ends. If the determination of operation 422 is NO, then at operation 432, data is collected generated based on the relevant data that was determined based on the sensor availability information 404. Before generating the data, a determination can also be made using the sensor capability information 404 to identify which sensors have the appropriate capabilities to collect the data requested by the data request, including to collect data for a portion of the geographic area that was requested by the data request and was not yet covered or to repeat a data collection that had poor quality. At operation 432 a request can be submitted for the identified sensors to collect the data requested. After the sensors collect the data, the data collections can be received at operation 432. At operation 432 the data collections received are processed, which can include formatting the data collections received into a format that can be used for additional processing by the info layer 104 and data layer 106. Results of the processing performed at operation 432 are output as data. The data can be processed at operations 416 or 450.

The method continues at operations 450 and 416. At operation 450, the data is added to the data database 134, after which the branch of processing that reached operation 450 ends. The data stored to the data database 134 will be available for processing of future info requests and/or for further processing of the intel request 120, such as if operation 412 is repeated before the intel requirement is determined to be satisfied at operation 222 of flowchart 200 in FIG. 2. At operation 416, the data is published and evaluated with respect to the data layer request at operation 420.

If the determination at operation 414 is NO, meaning that relevant info was not found, then the method continues at operation 420.

Aspects of the present disclosure are described above with reference to flow diagram illustrations and/or block diagrams of methods, apparatus (systems) and computer program products according to embodiments of the disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

Embodiments of the TIS system 100 may be implemented or executed by one or more computer systems. For example, intel layer 102, info layer 104, and data layer 106 of the TIS 200 can be implemented using one or more computer systems such as example computer system 502 illustrated in FIG. 5. Each computer system 502 can implement one or more of intel layer 102, info layer 104, and data layer 106. In various embodiments, computer system 502 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Figure 5:
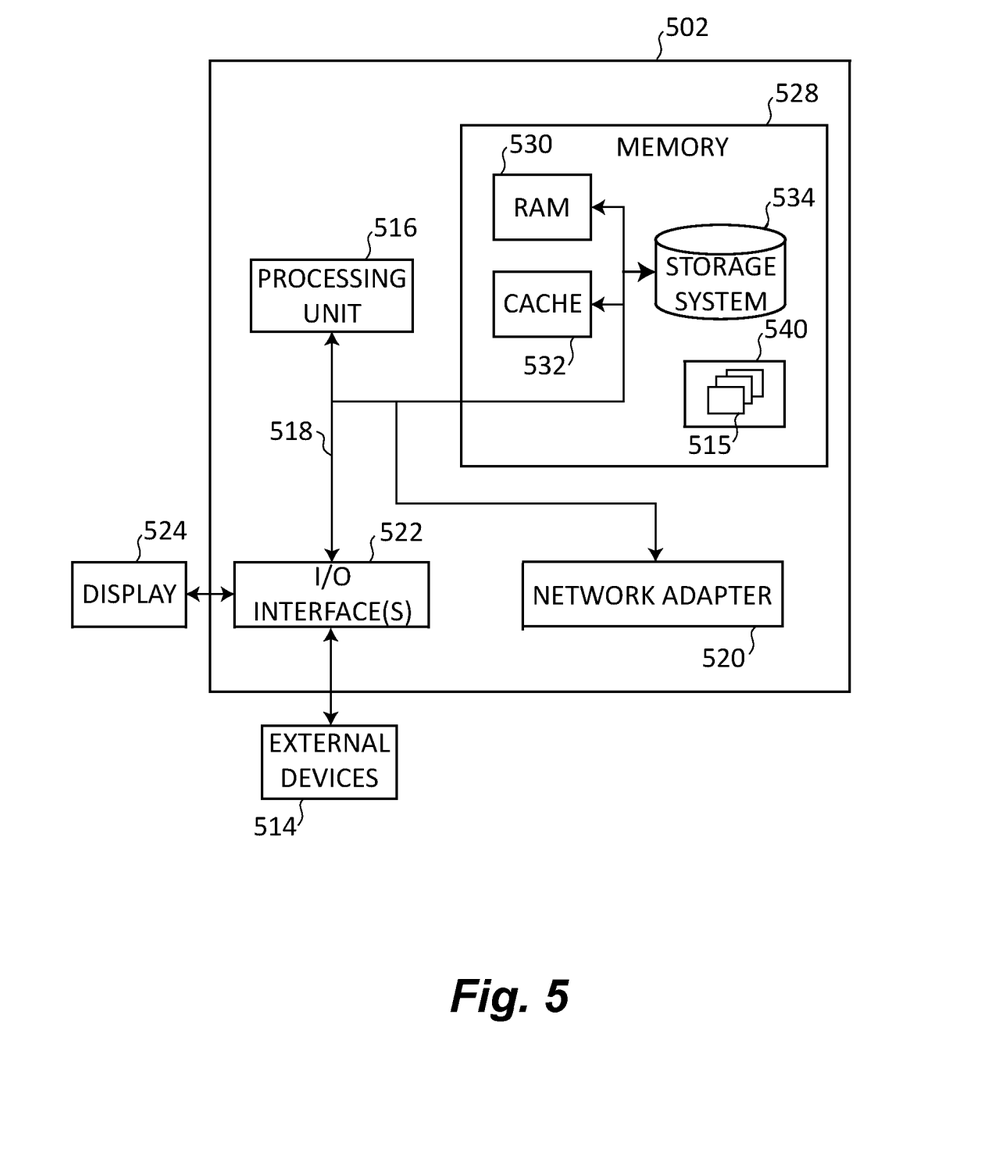
FIG. 5 is a block diagram of an exemplary computer system configured to implement layers of the TIS in accordance with embodiments of the disclosure.

Computer system 502 is only one example of a suitable system and is not intended to suggest any limitation as to the scope of use or functionality of embodiments of the disclosure described herein. Regardless, computer system 502 is capable of being implemented and/or performing any of the functionality set forth hereinabove.

Computer system 502 may be described in the general context of computer system-executable instructions, such as program modules, being executed by a computer system. Generally, program modules may include routines, programs, objects, components, logic, data structures, and so on that perform particular tasks or implement particular abstract data types. Computer system 502 may be practiced in distributed data processing environments where tasks are performed by remote processing devices that are linked through a communications network. In a distributed data processing environment, program modules may be located in both local and remote computer system storage media including memory storage devices.

Computer system 502 is shown in FIG. 5 in the form of a general-purpose computing device. The components of computer system 502 may include, but are not limited to, one or more processors or processing units 516, a system memory 528, and a bus 518 that couples various system components including system memory 528 to processor 516. Additionally, the buses 518 of computer systems 502 for respective intel layer 102, info layer 104, and data layer 106 can be coupled to provide communication between the intel layer 102, info layer 104, and data layer 106.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 502 typically includes a variety of computer system readable media. Such media may be any available media that is accessible by the TIS 100, and it includes both volatile and non-volatile media, removable and non-removable media.

System memory 528 can include computer system readable media in the form of volatile memory, such as random access memory (RAM) 530 and/or cache memory 532. Computer system 502 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 515, such as for performing the operations of flowcharts 200, 300 and 400 shown in FIGS. 2, 3, and 4, respectively, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 515 generally carry out the functions and/or methodologies of embodiments of the disclosure as described herein.

Computer system 502 may also communicate with one or more external devices 514 such as a keyboard, a pointing device, a display 524, etc.; one or more devices that enable a user to interact with computer system 502; and/or any devices (e.g., network card, modem, etc.) that enable the TIS 100 to communicate with one or more other computing devices. Such communication can occur via Input/Output (I/O) interfaces 522. Still yet, computer system 502 can communicate with one or more networks such as a local area network (LAN), a general wide area network (WAN), and/or a public network (e.g., the Internet) via network adapter 520. As depicted, network adapter 520 communicates with the other components of the TIS 100 via bus 518. It should be understood that although not shown, other hardware and/or software components could be used in conjunction with computer system 502. Examples, include, but are not limited to: microcode, device drivers, redundant processing units, external disk drive arrays, RAID systems, tape drives, and data archival storage systems, etc.

The flow diagram and block diagrams in the Figures illustrate the architecture, functionality, and operation of possible implementations of systems, methods and computer program products according to various embodiments of the present disclosure. In this regard, each block in the flow diagram or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method the ability to autonomously process a directive submitted to the TIS 100 and satisfy the directive without human intervention. The layers of the TIS 100 can evaluate information that is available to them, request additional information from the other layers, and use information provided from the other layers to process the directive and provide intelligence information that satisfies the directive.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

What is claimed is:

1. A layered tactical information system, the system comprising multiple layers, each layer comprising:
a memory configured to store instructions;
a processor disposed in communication with the memory, wherein:
the processor of each layer of the multiple layers, upon execution of the instructions is configured to:
search for relevant data available to the processor of the layer in response to at least one of a layer request from the processor of another layer of the multiple layers and a directive received by a processor of a first layer of the multiple layers, the directive specifying an end state, one or more target types, a time window, a geographic location area, and a first layer requirement of at least one layer requirement to be satisfied by the processor of the first layer;
evaluate whether a layer requirement of the at least one layer requirement for the layer is satisfied based on at least one of (a) any found relevant data that was found by the search and (b) layer data obtained from at least one of the other layers; and
when the layer requirement for the layer is not satisfied, perform at least one of (a) transmitting, by the processor of the layer to the processor of another layer of the multiple layers, a layer request to gather further information and (b) generating layer data and providing the layer data generated to the processor of at least one other layer,
wherein the first layer is an intelligence layer, a second layer of the multiple layers is an information layer, and a third layer of the multiple layers is a data layer, and
the processor of the intelligence layer is configured to search for first relevant data of the relevant data in at least one of stored intelligence layer data and received information layer data of the layer data, and evaluate the first layer requirement, and when the first layer requirement is not satisfied, the processor of the intelligence layer is further configured to transmit a first request of the layer request for the information layer data to the processor of the information layer, receive the information layer data from the processor of the information layer, generate intelligence layer data of the layer data based on the information layer data received, and at least one of provide the intelligence layer data and/or the first relevant data to an external source and store the intelligence layer data.

2. The layered tactical information system of claim 1, wherein the processor of the data layer is configured to search for third relevant data of the relevant data in stored data layer data, provide the third relevant data to the processor of the information layer, and evaluate a third layer requirement of the layer requirement, and when the third layer requirement is not satisfied, the processor of the data layer is further configured to generate the data layer data based on sensor data received from a sensor source, and at least one of provide the data layer data and/or the third relevant data to the processor of the information layer and store the data layer data.

3. The layered tactical information system of claim 1, wherein providing the layer data to the at least one other layer includes publishing the layer data.

4. A layered tactical information system, the system comprising multiple layers, each layer comprising:
   a memory configured to store instructions;
   a processor disposed in communication with the memory, wherein:
      the processor of each layer of the multiple layers, upon execution of the instructions is configured to:
      search for relevant data available to the processor of the layer in response to at least one of a layer request from the processor of another layer of the multiple layers and a directive received by a processor of a first layer of the multiple layers, the directive specifying an end state, one or more target types, a time window, a geographic location area, and a first layer requirement of at least one layer requirement to be satisfied by the processor of the first layer;
      evaluate whether a layer requirement of the at least one layer requirement for the layer is satisfied based on at least one of (a) any found relevant data that was found by the search and (b) layer data obtained from at least one of the other layers; and
      when the layer requirement for the layer is not satisfied, perform at least one of (a) transmitting, by the processor of the layer to the processor of another layer of the multiple layers, a layer request to gather further information and (b) generating layer data and providing the layer data generated to the processor of at least one other layer,
      wherein the first layer is an intelligence layer, a second layer of the multiple layers is an information layer, and a third layer of the multiple layers is a data layer, and further:
      wherein the processor of the information layer is configured to search for second relevant data of the relevant data in at least one of stored information layer data and data layer data of the layer data provided by the processor of the data layer, provide the second relevant data to the processor of the intelligence layer, and evaluate a second layer requirement of the layer requirement, and when the second layer requirement is not satisfied, the processor of the information layer is further configured to transmit a second request of the layer request for the data layer data to the processor of the data layer, receive the data layer data from the processor of the data layer, generate information layer data of the layer data based on at least one of the data layer data received and automatic target recognition (ATR) data received from an ATR source, and at least one of provide the information layer data and/or the second relevant data to the processor of the intelligence layer and store the information layer data, or
      wherein the processor of the information layer is further configured to apply a fusion process to at least of the second relevant data and the received data to output a single fused data element based on several data elements to which the fusion process is applied, and provide the fused data element to the processor of the intelligence layer and/or store the fused data element.

5. The layered tactical information system of claim 4, wherein the processor of the intelligence layer is configured to search for first relevant data of the relevant data in at least one of stored intelligence layer data and received information layer data of the layer data, and evaluate the first layer requirement, and when the first layer requirement is not satisfied, the processor of the intelligence layer is further configured to transmit a first request of the layer request for the information layer data to the processor of the information layer, receive the information layer data from the processor of the information layer, generate intelligence layer data of the layer data based on the information layer data received, and at least one of provide the intelligence layer data and/or the first relevant data to an external source and store the intelligence layer data.

6. The layered tactical information system of claim 4, wherein the processor of the information layer is further configured to apply a fusion process to at least of the second relevant data and the received data to output a single fused data element based on several data elements to which the fusion process is applied, and provide the fused data element to the processor of the intelligence layer and/or store the fused data element.

7. A method of sharing tactical information between multiple layers, the method performed by a processor of each layer of the multiple layers comprising:
   searching for relevant data available to the processor of the layer in response to at least one of a layer request from the processor of another layer of the multiple layers and a directive received by a processor of a first layer of the multiple layers, the directive specifying an end state, one or more target types, a time window, a geographic location area, and a first layer requirement of at least one layer requirement to be satisfied by the processor of the first layer;
   evaluating whether a layer requirement of the at least one layer requirement for the layer is satisfied based on at least one of (a) any found relevant data that was found by the search and (b) layer data obtained from at least one of the other layers; and
   when the layer requirement for the layer is not satisfied, performing at least one of (a) transmitting, by the processor of the layer to the processor of another layer of the multiple layers, a layer request to gather further information and (b) generating layer data and providing the layer data generated to the processor of at least one other layer,
   wherein the first layer is an intelligence layer, a second layer of the multiple layers is an information layer, and a third layer of the multiple layers is a data layer, and
   wherein the method further comprises the processor of the intelligence layer:

searching for first relevant data of the relevant data in at least one of stored intelligence layer data and received information layer data of the layer data;
evaluating the first layer requirement; and
when the first layer requirement is not satisfied,
transmitting a first request of the layer request for the information layer data to the processor of the information layer;
receiving the information layer data from the processor of the information layer;
generating intelligence layer data of the layer data based on the information layer data received; and
at least one of providing the intelligence layer data and/or the first relevant data to an external source and storing the intelligence layer data.

8. The method as recited in claim 7, wherein the method further comprises the processor of the data layer:
searching for third relevant data of the relevant data in stored data layer data;
providing the third relevant data to the processor of the information layer;
evaluating a third layer requirement of the layer requirement; and
when the third layer requirement is not satisfied,
generating the data layer data based on sensor data received from a sensor source; and
at least one of providing the data layer data and/or the third relevant data to the processor device of the information layer, and stores the data layer data.

9. The method as recited in claim 7, wherein providing the layer data to the at least one other layer includes publishing the layer data.

10. A method of sharing tactical information between multiple layers, the method performed by a processor of each layer of the multiple layers comprising:
searching for relevant data available to the processor of the layer in response to at least one of a layer request from the processor of another layer of the multiple layers and a directive received by a processor of a first layer of the multiple layers, the directive specifying an end state, one or more target types, a time window, a geographic location area, and a first layer requirement of at least one layer requirement to be satisfied by the processor of the first layer;
evaluating whether a layer requirement of the at least one layer requirement for the layer is satisfied based on at least one of (a) any found relevant data that was found by the search and (b) layer data obtained from at least one of the other layers; and
when the layer requirement for the layer is not satisfied, performing at least one of (a) transmitting, by the processor of the layer to the processor of another layer of the multiple layers, a layer request to gather further information and (b) generating layer data and providing the layer data generated to the processor of at least one other layer,
wherein the first layer is an intelligence layer, a second layer of the multiple layers is an information layer, and a third layer of the multiple layers is a data layer, and further:
wherein the method further comprises the processor of the information layer:
searching for second relevant data of the relevant data in at least one of stored information layer data and data layer data of the layer data provided by the processor of the data layer;
providing the second relevant data to the processor of the intelligence layer;
evaluating a second layer requirement of the layer requirement; and
when the second layer requirement is not satisfied,
transmitting a second request of the layer request for the data layer data to the processor of the data layer;
receiving the data layer data from the processor of the data layer;
generating information layer data of the layer data based on at least one of the data layer data received and automatic target recognition (ATR) data received from an ATR source; and
at least one of providing the information layer data and/or the second relevant data to the processor of the intelligence layer and storing the information layer data, or
wherein the method further comprises the processor of the information layer:
applying a fusion process to at least of the second relevant data and the received data to output a single fused data element based on several data elements to which the fusion process is applied; and
providing the fused data element to the processor of the intelligence layer and/or storing the fused data element.

11. A non-transitory computer readable storage medium having one or more computer programs stored therein associated with multiple layers of a tactical information system, the computer programs associated with each layer comprising instructions, which when executed by a processor of a computer system, cause the processor to:
search for relevant data available to the processor of the layer in response to at least one of a layer request from a processor of another layer of the multiple layers and a directive received by a processor of a first layer of the multiple layers, the directive specifying an end state, one or more target types, a time window, a geographic location area, and a first layer requirement of at least one layer requirement to be satisfied by the processor of the first layer; evaluate whether a layer requirement of the at least one layer requirement for the layer is satisfied based on at least one of (a) any found relevant data that was found by the search and (b) layer data obtained from at least one of the other layers; and
when the layer requirement for the layer is not satisfied, perform at least one of (a) transmitting, by the processor of the layer to the processor of another layer of the multiple layers, a layer request to gather further information and (b) generating layer data and providing the layer data generated to the processor of at least one other layer,
wherein the first layer is an intelligence layer, a second layer of the multiple layers is an information layer, and a third layer of the multiple layers is a data layer, and
wherein the computer programs associated with the intelligence layer, when executed by a computer system, cause the computer system to:
search for first relevant data of the relevant data in at least one of stored intelligence layer data and received information layer data of the layer data;
evaluate the first layer requirement; and
when the first layer requirement is not satisfied,
transmit a first request of the layer request for the information layer data to the processor of the information layer;

receive the information layer data from the processor of the information layer;

generate intelligence layer data of the layer data based on the information layer data received; and at least one of provide the intelligence layer data and/or the first relevant data to an external source and store the intelligence layer data.

12. A non-transitory computer readable storage medium having one or more computer programs stored therein associated with multiple layers of a tactical information system, the computer programs associated with each layer comprising instructions, which when executed by a processor of a computer system, cause the processor to:

search for relevant data available to the processor of the layer in response to at least one of a layer request from a processor of another layer of the multiple layers and a directive received by a processor of a first layer of the multiple layers, the directive specifying an end state, one or more target types, a time window, a geographic location area, and a first layer requirement of at least one layer requirement to be satisfied by the processor of the first layer;

evaluate whether a layer requirement of the at least one layer requirement for the layer is satisfied based on at least one of (a) any found relevant data that was found by the search and (b) layer data obtained from at least one of the other layers; and when the layer requirement for the layer is not satisfied, perform at least one of (a) transmitting, by the processor of the layer to the processor of another layer of the multiple layers, a layer request to gather further information and (b) generating layer data and providing the layer data generated to the processor of at least one other layer, wherein the first layer is an intelligence layer, a second layer of the multiple layers is an information layer, and a third layer of the multiple layers is a data layer, and, wherein the computer programs associated with the information layer, when executed by a computer system, cause the computer system to:

search for second relevant data of the relevant data in at least one of stored information layer data and data layer data of the layer data provided by the data layer;

provide the second relevant data to the processor of the intelligence layer;

evaluate a second layer requirement of the layer requirement; and when the second layer requirement is not satisfied, transmit a second request of the layer request for the data layer data to the processor of the data layer;

receive the data layer data from the processor of the data layer;

generate information layer data of the layer data based on at least one of the data layer data received and automatic target recognition (ATR) data received from an ATR source; and at least one of provide the information layer data and/or the second relevant data to the processor of the intelligence layer and store the information layer data.

13. The non-transitory computer readable storage medium as recited in claim 12, wherein the computer programs associated with the intelligence layer, when executed by a computer system, cause the computer system to:

search for first relevant data of the relevant data in at least one of stored intelligence layer data and received information layer data of the layer data;

evaluate the first layer requirement; and when the first layer requirement is not satisfied, transmit a first request of the layer request for the information layer data to the processor of the information layer;

receive the information layer data from the processor of the information layer;

generate intelligence layer data of the layer data based on the information layer data received; and at least one of provide the intelligence layer data and/or the first relevant data to an external source and store the intelligence layer data.

14. A non-transitory computer readable storage medium having one or more computer programs stored therein associated with multiple layers of a tactical information system, the computer programs associated with each layer comprising instructions, which when executed by a processor of a computer system, cause the processor to:

search for relevant data available to the processor of the layer in response to at least one of a layer request from a processor of another layer of the multiple layers and a directive received by a processor of a first layer of the multiple layers, the directive specifying an end state, one or more target types, a time window, a geographic location area, and a first layer requirement of at least one layer requirement to be satisfied by the processor of the first layer;

evaluate whether a layer requirement of the at least one layer requirement for the layer is satisfied based on at least one of (a) any found relevant data that was found by the search and (b) layer data obtained from at least one of the other layers; and when the layer requirement for the layer is not satisfied, perform at least one of (a) transmitting, by the processor of the layer to the processor of another layer of the multiple layers, a layer request to gather further information and (b) generating layer data and providing the layer data generated to the processor of at least one other layer, wherein the first layer is an intelligence layer, a second layer of the multiple layers is an information layer, and a third layer of the multiple layers is a data layer, and further;

wherein the computer programs associated with the data layer, when executed by a computer system, cause the computer system to:

search for third relevant data of the relevant data in stored data layer data;

provide the third relevant data to the processor of the information layer;

evaluate a third layer requirement of the layer requirement; and when the third layer requirement is not satisfied, generate the data layer data based on sensor data received from a sensor source; and at least one of provide the data layer data and/or the third relevant data to the processor of the information layer and stores the data layer data, or wherein the computer programs associated with the information layer, when executed by a computer system, cause the computer system to:

apply a fusion process to at least of the second relevant data and the received data to output a single fused data element based on several data elements to which the fusion process is applied; and provide the fused data element to the processor of the intelligence layer and/or store the fused data element.

\* \* \* \* \*